(12) United States Patent
Ding et al.

(10) Patent No.: US 9,936,711 B1
(45) Date of Patent: Apr. 10, 2018

(54) CONTINUOUS DRYING FOR ANTARCTIC KRILL AND PROCESSING OF SHELLED ANTARTIC KRILL ON BOARD

(71) Applicant: ZHEJIANG UNIVERSITY OF TECHNOLOGY, Zhejiang (CN)

(72) Inventors: Yuting Ding, Zhejiang (CN); Xuxia Zhou, Zhejiang (CN); Shulai Liu, Zhejiang (CN); Jianhua Liu, Zhejiang (CN); Fei Lv, Zhejiang (CN); Shanping Chen, Zhejiang (CN); Peicheng Zhao, Zhejiang (CN); Jianyou Zhang, Zhejiang (CN); Saiqi Gu, Zhejiang (CN); Xia Xu, Zhejiang (CN); Zhicheng Zheng, Zhejiang (CN)

(73) Assignee: ZHEJIANG UNIVERSITY OF TECHNOLOGY, Hangzhou, Zhejiang (CN)

(*) Notice: Subject to any disclaimer, the term of this patent is extended or adjusted under 35 U.S.C. 154(b) by 0 days.

(21) Appl. No.: 15/596,691

(22) Filed: May 16, 2017

(51) Int. Cl.
  *A22C 29/02* (2006.01)
  *A22C 29/00* (2006.01)

(52) U.S. Cl.
  CPC .......... *A22C 29/026* (2013.01); *A22C 29/005* (2013.01); *A22C 29/021* (2013.01); *A22C 29/023* (2013.01)

(58) Field of Classification Search
  CPC ..... A22C 29/00; A22C 29/026; A22C 29/021; A22C 29/005; A22C 29/023
  USPC ................................................ 452/1–11, 174
  See application file for complete search history.

(56) References Cited

U.S. PATENT DOCUMENTS

| | | | | |
|---|---|---|---|---|
| 4,307,492 A * | 12/1981 | Braginsky | ............ | A22C 29/026 452/5 |
| 4,393,544 A * | 7/1983 | Lapeyre | ................ | A22C 29/026 452/5 |
| 4,769,870 A * | 9/1988 | Hansen | ................. | A22C 29/025 452/5 |
| 6,099,400 A * | 8/2000 | Ragnarsson | ......... | A22C 29/026 452/2 |
| 6,112,699 A * | 9/2000 | Saxby | .................... | A01K 80/00 119/213 |

(Continued)

*Primary Examiner* — Richard T Price, Jr.
(74) *Attorney, Agent, or Firm* — Saliwanchik, Lloyd & Eisenschenk

(57) ABSTRACT

The present invention relates to a continuous on-board drying method for Antarctic krill and a continuous on-board processing method of shelled Antarctic krill. The drying method includes the following steps: 1) subjecting fishing materials to cleaning, sorting, and dewatering with a vibrating screen; 2) rapidly heating the krill to the temperature of up to 70° C. using infra-red rays; 3) hot-air drying; 4) impurity removal by vacuum; 5) cooling to obtain dried krill. The processing method includes the following steps: a) subjecting fishing materials to cleaning, sorting, and dewatering with a vibrating screen; b) rapidly heating the krill to the temperature of up to 70° C. using infra-red rays; c) hot-air drying; d) subjecting the dried krill to shelling treatment to separate shell from meat, to obtain shelled krill; e) impurity removal by vacuum to obtain shelled krill product. The methods in the present invention are highly efficient, energy saving, green and environmental protection, and the krill products have high quality and safety.

10 Claims, 2 Drawing Sheets

(56) References Cited

U.S. PATENT DOCUMENTS

| | | | |
|---|---|---|---|
| 2005/0186893 A1* | 8/2005 | Hulin | A22C 29/005 452/2 |
| 2011/0224450 A1* | 9/2011 | Sclabos Katevas | A23D 9/007 554/23 |
| 2011/0269384 A1* | 11/2011 | Andersen | A22C 29/028 452/1 |
| 2015/0327560 A1* | 11/2015 | Merry | A22C 29/00 452/12 |
| 2016/0183542 A1* | 6/2016 | Fogarty | A22C 29/025 452/1 |

* cited by examiner

CONTINUOUS DRYING FOR ANTARCTIC KRILL AND PROCESSING OF SHELLED ANTARTIC KRILL ON BOARD

TECHNICAL FIELD OF THE INVENTION

The present invention relates to on-board processing technology, field of Antarctic krill after fishing, especially to continuous and highly-efficient drying of Antarctic krill, and continuous processing of shelled Antarctic krill on board after fishing at polar area.

BACKGROUND OF THE INVENTION

For a long time, the production of seafood adopts the following traditional means: firstly marine fishing; secondly, salting processing or ice preservation and transportation; finally, processing on the land. The polar resource, Antarctic krill, is small-size, easily deteriorated, and hard to preserve. According to traditional means, after fishing of Antarctic krill, they are frozen and transported to the land. The frozen ones are processed to either powder or shrimp surimi after shelling. Because the content of fluorine in krill shell is up to 3300 mg/kg, while the content of fluorine in krill meat is about 50 mg/kg, the traditional processing methods would make fluorine transfer to krill meat, leading to the decrease of quality and safety of the product. On the other hand, due to the high activity of low-temperature proteinase within krill, the hydrolysis of krill protein during thawing by proteinase would make the product decrease in yield and deteriorate heavily in quality. Traditionally, krill is boiled and then dried to make product, which would make fluorine transfer to krill meat, and arise another problem of discharging cooking soup. Direct discharging of cooking soup is totally forbidden in Antarctic area because the cooking soup would make the water eutrophication. In addition, krill has abundant astaxanthin, and improper processing can easily destroy astaxanthin and thus decrease the colour of the krill product. In the present invention, an innovative model of on-board fast enzyme inactivation by infra-red and combined hot-air drying provides a best way to solve the problems.

BRIEF SUMMARY

The first aim of the present invention is to provide a continuous on-board drying method for Antarctic krill. The method is highly efficient, energy saving, green and environmental protection, and the krill product has high quality and safety.

The second aim of the present invention is to provide a continuous onboard processing method of shelled krill. The method is highly efficient, energy saving, green and environmental protection, and the shelled krill product has high quality and safety.

The technical solutions adopted by the present invention for the aims mentioned above are described in details.

The present invention provides a continuous on-board drying method for Antarctic krill, which comprises the following steps:

1) cleaning and sorting of fishing materials: the fresh and live krill is cleaned by seawater, sorted, and then dewatered using a vibrating screen;

2) heating using infra-red: after treated in step 1), the krill is put evenly onto a conveyor belt to enter a multilayer (preferably 3 to 9-layer) drying cabinet, heated rapidly up to 70° C. using one or several infra-red rays ranging from 1 μm to 400 μm, which can inactivate the low-temperature proteinase and polyphenoloxidase;

3) hot-air drying: after treated in step 2), the krill is subjected to hot-air drying at 55° C. -90° C. until the moisture content of the krill falls to not more than 40%;

4) impurity removal by vacuum: impurities such as small antennas mixing in the krill obtained in step 3) are removed by vacuum:

5) cooling: after treated in step 4), the krill is put into a cooling cabinet and cooled at −15° C. -5° C. for 15 min to make the temperature of the krill decrease rapidly to 0° C.-10° C., and then dried krill is obtained.

Further, the continuous on-board drying method for Antarctic krill includes a step as follows: 6) screening: the dried krill obtained in step 5) is screened according to the shape size.

More further, the continuous on-board drying method for Antarctic krill includes a step as follows: 7) packaging and storage: the screened dried krill is subjected to packaging according to its specifications and then to storage at room or cold temperature.

In step 1) mentioned above, the krill is put onto a vibrating screen with a vibrating frequency of 300 r/min-1150 r/min (the optimal is 750 r/min), to remove the water droplets on the krill.

In step 2) mentioned above, infra-red is highly efficient, energy saving, healthy and controllable. It is an innovative heating method. Its rapid heating and strong penetrating is especially suitable for enzyme inactivation and sterilization of krill. Nevertheless, over-heating using infrared would make the colour of the astaxanthin in krill shell turn dark, and also make krill capillary porous body comprising proteins and chitin compact, which easily makes surface of the krill hard and prevents water in the meat from evaporation, thereby decreasing the drying quality and efficiency. The present invention selects one or several infra-red rays ranging from 1 μm-300 μm which can be easily absorbed by krill. The normal distribution of heat radiation from heat source could not only make krill heating uniform from inner to outer parts but also make the temperature of the krill rapidly up to 70° C. with obvious effect of inactivating microorganisms and enzymes. Meanwhile, the temperature of krill can be directly used as later heating for hot-air drying and dehydration. In the present invention, an infra-red ray within 8 μm -20 μm is preferred to use to heat the krill. In step 2), it is preferred to heat the krill to 70° C. -75° C.

In step 3) mentioned above, the temperature of the hot-air is controlled between 55° C. and 90° C., preferably between 65° C. and 80° C. The step 3) includes the following two stages: stage one (fast dehydration): the drying temperature is controlled between 65° C. and 90° C., the drying air velocity is between 0.5 m/s and 3.5 m/s, and the drying time is between 2 min to 20 min; stage two (moisture transfer from inner krill to outer krill): the drying temperature is controlled between 55° C. and 80° C., the drying air velocity is between 0.5 m/s to 3.0 m/s, and the drying time is between 5 min and 25 min.

In step 4) mentioned above, impurities such as small antennas mixing in krill are removed by vacuum, and relative vacuum degree is controlled at −15 kPa-−80 kPa. If the relative vacuum degree is less than −15 kPa, impurities such as small antennas cannot be removed. If the relative vacuum degree is more than 80 kPa, the impurities and krill would be all removed, therefore the purpose of separation can not be achieved.

The present invention also provides a continuous on-board processing method of shelled Antarctic krill, which comprises the following steps:

a) cleaning and sorting of fishing materials: the fresh and live krill is cleaned by seawater, sorted, and then dewatered using a vibrating screen;

b) heating using infra-red: after treated in step a), the krill is put evenly onto a conveyor belt to enter a multilayer drying cabinet, heated rapidly up to 70° C. using one or several infra-red rays ranging from 1 μm to 400 μm, which can inactivate the low-temperature proteinase and polyphenoloxidase;

c) hot-air drying: after treated in step b), the krill is subjected to hot-air drying at 55° C. -90° C. until the moisture content of the krill falls to not more than 40%;

d) shelling treatment: after treated in step c), the krill, whose moisture content has been not more than 40%, is treated with a shell crusher to separate shell from meat, and finally shelled krill is obtained;

e) impurity removal by vacuum: impurities such as small antennas and shell mixing in the shelled krill obtained in step d) are removed by vacuum to obtain shelled krill product.

Further, the continuous on-board processing method for Antarctic krill includes a step as follows: f) screening: the shelled krill product is screened according to the shape size.

More further, the continuous on-board processing method for Antarctic krill includes a step as follows: g) packaging and storage: the screened shelled krill is subjected to packaging according to its specifications and then to storage at room or cold temperature. Generally, the shelled krill with moisture content not more than 21% can be stored at room temperature, otherwise need cold storage.

In the present invention, the above-mentioned shell crusher is a differential roll on roll krill shelling machine sold in the market. It works as follows: the dried krill is beaten, rubbed, collided repeatedly by steel rods, the krill shell is broken and blown away using a fan to separate shell from meat, and finally shelled krill is obtained.

In the present invention of the above-mentioned continuous on-board processing method for shelled krill, the processing details in step a) and c) are the same to step 1) and 4) of the above -mentioned continuous on-board drying method for krill, respectively. Therefore, there are no more details here.

Compared with the prior art, the advantages of the present invention are as follows:

1) The continuous on-board drying method for Antarctic krill and the continuous processing method for shelled Antarctic krill do not produce by-products such as cooking soup and waste water. The present invention uses infra-red to heat krill, which could not only make krill heating uniform from inner to outer parts but also make the temperature of the krill rapidly up to 70° C. with obvious effect of inactivating microorganisms and enzymes. Meanwhile, the temperature of the krill can be directly used as later heating for hot-air drying and dehydration. It is highly efficient, energy saving, healthy and controllable, and suitable for "green" processing in polar area where the wastewater discharge is forbidden.

2) the drying method to dehydrate krill makes its weight lose by two to three times, leading to a great reduction of cost in long-distance transportation.

3) the processing method for shelled krill makes the shell and meat separate on board. The shelled krill and shell are packaged respectively, and the shell do not need cold storage, which cuts the production cost.

4) the present invention makes the obtained by-product (e.g. the shell) collected on board, which reduces the environmental pollution. The shell also can be used in chitosan production to increase added value.

5) In the dried krill and shelled krill obtained in the present invention, the fluorine content in the meat of the dried krill is only 150 ppm-300 ppm (based on dry matter), less than the frozen products and surimi (350 ppm-750 ppm). The present invention greatly reduces fluorine content in krill meat and greatly increases food quality and safety.

DETAILED DESCRIPTION

The further description of the present invention is made with figures.

EXAMPLE 1

Figure 1:
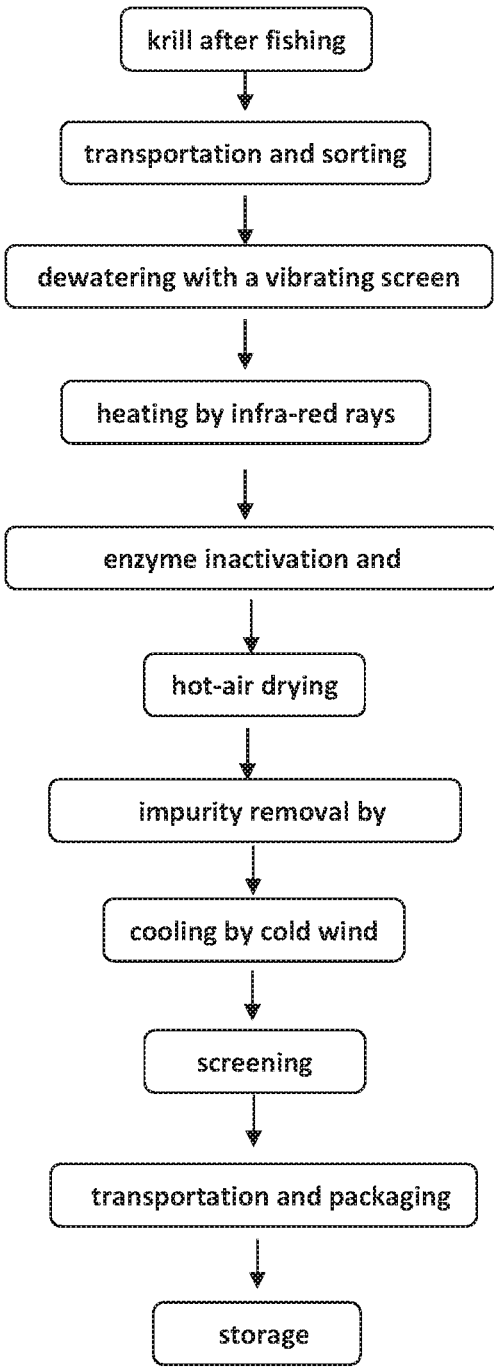
FIG. 1 describes the flow chart of a continuous onboard drying method for Antarctic krill.

Referring to FIG. 1, a continuous on-board drying method for fresh and live Antarctic krill after fishing, is executed as follows:

1) Cleaning and sorting of fishing materials: the fresh and live krill is cleaned by seawater, sorted, and then the water droplets on the krill are removed using a vibrating screen at a vibrating frequency of 1050 r/min;

2) Heating using infra-red: after processed in step 1), krill is put evenly onto a conveyor belt to go into a seven-layer drying cabinet. It is heated for 3.5 min using a strong-penetration-force near infra-red ray at a wavelength of 1 μm. After the center temperature of the krill reaching 75° C., the activities of low-temperature proteinase and polyphenoloxidase are inhibited and starts to disappear;

3) Hot-air drying: after processed in step 2), krill goes to the first stage of hot-air drying: the temperature of hot air is controlled at 75° C., and the drying air velocity is 1.0 m/s. After drying for 10 min, the low-temperature proteinase and polyphenoloxidase are inactivated completely. Then it comes to the second stage of hot-air drying: the temperature of hot air is controlled at 65° C., and the drying air velocity is 3.0 m/s. After drying for 25 min, the final moisture content of the krill is down to 38%, and the weight is decreased by two times.

4) Impurity removal by vacuum: Impurities such as small antennas mixing in the krill obtained in step 3) are removed by vacuum at relative vacuum degree of −30 kPa.

5) Cooling: after processed in step 4), the Krill is put into a cooling cabinet and cooled at 5° C. for 3 min. The temperature of the krill decreased rapidly to 5° C., and then the dried krill is obtained. The fluorine content in the meat of the dried krill is 235 ppm (based on dry matter).

6) Vibrating screening: after processed in step 5), the dried krill is screened according to the shape size.

7) Packaging and cold storage: The screened dried krill is subjected to packaging according to its specifications and then to storage at a temperature not more than −18° C.

EXAMPLE 2

Referring to FIG. 1, a continuous and efficient on-board drying method for fresh and live Antarctic krill after fishing at polar area, is executed as follows:

1) Cleaning and sorting of fishing materials: The fresh and live krill is cleaned by seawater and sorted, and then the water droplets on the krill are removed using a vibrating screen at a vibrating frequency of 1050 r/min.

2) Heating using infra-red: after processed in step 1), the krill is put evenly onto a conveyor belt to go into a seven-layer drying cabinet. It is heated for 3.0 min using a strong-penetration-force far infra-red ray at a wavelength of 20 μm. After the center temperature of the krill reaches 72° C., the activities of low-temperature proteinase and polyphenoloxidase are inhibited and starts to disappear.

3) Hot-air drying: after processed in step 2), the krill goes to the first stage of hot-air drying: the temperature of the hot air is controlled at 72° C., and the drying air velocity is 2.0 m/s. After drying for 15 min, the low-temperature proteinase and polyphenoloxidase are inactivated completely. Then it comes to the second stage of hot-air drying: the temperature of hot air is controlled at 70° C., and the drying air velocity is 3.5 m/s. After drying for 22 min, the final moisture content of the krill is down to 30%, and the weight is decreased by 2.5 times.

4) Impurity removal by vacuum: impurities such as small antennas mixing in the krill obtained in step 3) are removed by vacuum at a relative vacuum degree of −50 kPa.

5) Cooling: after processed in step 4), the krill is put into a cooling cabinet and cooled at 0° C. for 3 min. The temperature of the krill decreased rapidly to 10° C., and then the dried krill is obtained. The fluorine content in the meat of the dried krill is 192 ppm (based on dry matter).

6) Screening: after processed in step 5), the dried krill is screened according to the shape size.

Packaging and storage: The screened dried krill is subjected to packaging according to its specifications and then to storage at room or cold temperature.

EXAMPLE 3

Referring to FIG. 1, a continuous on-board drying method for fresh and live Antarctic krill after fishing, is executed as follows:

1) Cleaning and sorting of fishing materials: The fresh and live krill is cleaned by seawater and sorted, and then the water droplets on the krill are removed using a vibrating screen at a vibrating frequency of 600 r/min.

2) Heating using infra-red: after processed in step 1), the krill is put evenly onto a conveyor belt to go into a seven-layer drying cabinet. It is heated continuously for 2.5 min using strong-penetration-force near infra-red rays at a wavelength of 1 μm and weak-penetration-force far infra-red rays at a wavelength of 290 μm, wherein these rays are with a parallel or crossing distribution above the conveyor belt. After the center temperature of krill reaches 73° C., the activities of the low-temperature proteinase and polyphenoloxidase are inhibited and starts to disappear.

3) Hot-air drying: after processed in step 2), the krill goes to the first stage of hot-air drying: the temperature of the hot air is controlled at 85° C., and the drying air velocity is 2.0 m/s. After drying for 10 min, the low-temperature proteinase and polyphenoloxidase are inactivated completely. Then it comes to the second stage of hot-air drying: the temperature of hot air is controlled at 75° C., and the drying air velocity is 2.5 m/s. After drying for 10 min, the final moisture content of the krill is down to 20%, and the weight is decreased by 3 times.

4) Impurity removal by vacuum: impurities such as small antennas mixing in the krill obtained in step 3) are removed by vacuum at a vacuum degree of −40 kPa.

5) Cooling: after processed in step 4), the krill is put into a cooling cabinet and cooled at −2° C. for 4 min. The temperature of the krill decreased rapidly to 5° C., and then the dried krill is obtained. The fluorine content in the meat of the dried krill is 158 ppm (based on dry matter).

6) Screening: The dried Krill is screened according to the shape size.

7) Packaging and storage: The screened dried krill is subjected to packaging according to its specifications and then to storage at room or cold temperature.

EXAMPLE 4

Figure 2:
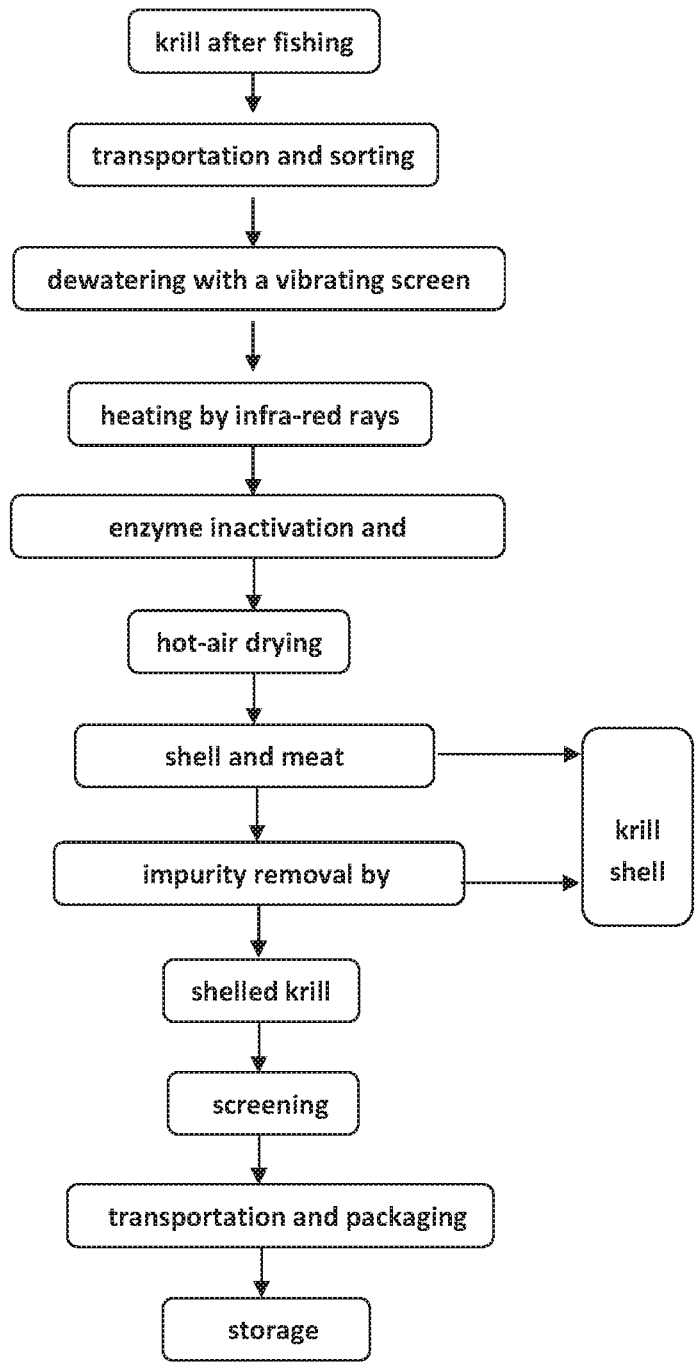
FIG. 2 describes the flow chart of a continuous on-board processing for shelled Antarctic krill.

Referring to FIG. 2, a continuous on-board processing method for fresh and live shelled Antarctic krill after fishing, is executed as follows:

Steps 1), 2) and 3) are the same to example 1.

4) Shelling treatment: after processed in step 3), the krill with a moisture content of 38% is beaten, rubbed, collided repeatedly with steel rods of a differential roll on roll krill shelling machine produced by Heibei Runlian Mechanical Equipment Company Limited. The krill shell is blown away using a fan to separate shell from meat. And finally the shelled krill is obtained. The fluorine content in the shelled krill is 245 ppm (based on. dry matter).

5) Impurity removal by vacuum: impurities such as small antennas and shell mixing in the shelled krill are removed by vacuum at a vacuum degree of −40 kPa.

6) Screening: after processed in step 5), the shelled krill is screened according to the shape size.

7) Packaging and storage: The screened shelled krill is subjected to packaging according to its specifications and then to storage at −18° C.

EXAMPLE 5

Referring to FIG. 2, a continuous on-board processing method for fresh and live shelled Antarctic krill after fishing is executed as follows:

Step 1), 2) and 3) are the same to example 3.

4) Shelling treatment: after processed in step 3), the krill with a moisture content of 20% is beaten, rubbed, collided repeatedly with steel rods of a differential roll on roll krill shelling machine produced by Heibei Runlian Mechanical Equipment Company Limited. The krill shell is blown away using a fan to separate shell from meat. And finally the shelled krill is obtained. The fluorine content in the shelled krill is 165 ppm (based on dry matter).

5) Impurity removal by vacuum: impurities such as small antennas and shell mixing in the shelled krill are removed by vacuum at a vacuum deuce of −20 kPa.

6) Screening: after processed in step 5), the shelled Krill is screened according to the shape size.

7) Packaging and storage: The screened shelled krill is subjected to packaging according to its specification and then to storage at room temperature.

What is claimed is:

1. A continuous on-board drying method for Antarctic krill, which comprises the following steps:
   1) cleaning and sorting of fishing materials: the fresh and live krill is cleaned by seawater, sorted, and then dewatered using a vibrating screen;
   2) after treated in step 1), the krill is put evenly onto a conveyor belt to enter a multilayer drying cabinet, heated rapidly up to 70° C. using one or several infra-red rays ranging from 1 µm to 400 µm, which can inactivate the low-temperature proteinase and polyphenoloxidase;

3) after treated in step 2), the krill is subjected to hot-air drying at 55° C.-90° C. until the moisture content of the krill falls to not more than 40%;

4) impurities mixing in the krill obtained in step 3) are removed by vacuum;

5) after treated in step 4), the krill is put into a cooling cabinet and cooled at −15° C.~−5° C. for 15 min to make the temperature of the krill decrease rapidly to 0° C.~10° C. and then dried krill is obtained.

2. The method according to claim 1, further comprising a step as follows, 6) the dried krill obtained in step 5) is screened according to the shape size.

3. The method according to claim 2, further comprising a step as follows, 7) the screened dried krill is subjected to packaging according to its specifications and then to storage at room or cold temperature.

4. The method according to claim 1, which is characterized in that, in step 1), the krill is put onto a vibrating screen with a vibrating frequency of 300 r/min-1150 r/min, to remove the water droplets on the krill.

5. The method according to claim 1, which is characterized in that, in step 2), the krill is heated rapidly up to 70° C. using one or several infrared rays ranging from 1 µm to 300 µm.

6. The method according to claim 1, which is characterized in that, in step 2), the krill is heated to 70° C.~75° C.

7. The method according to claim 1, which is characterized in that, the step 3) includes the following two stage, Stage one includes the drying temperature is controlled between 65° C. and 90° C., the drying air velocity is between 0.5 m/s and 3.5 m/s, and the drying time is between 2 min to 20 min;

Stage two includes the drying temperature is controlled between 55° C. and 80° C., the drying air velocity is between 0.5 m/s and 3.0 m/s, and the drying time is between 5 min to 25 min.

8. The method according to claim 1, which is characterized in that: in step 4), impurities mixing in the krill are removed by vacuum, and the relative vacuum degree is controlled to be between −15 kPa and −80 kPa.

9. A continuous on-board processing method of shelled Antarctic krill, which comprises the following steps:

a) the fresh and live krill is cleaned by seawater, sorted, and then dewatered using a vibrating screen;

b) after treated in step a), the krill is put evenly onto a conveyor belt to enter a multilayer drying cabinet, heated rapidly up to 70° C. using one or several infra-red rays ranging from 1 µm to 400 µm, which can inactivate the low-temperature proteinase and polyphenoloxidase;

c) after treated in step b), the krill is subjected to hot-air drying at 55° C. -90° C. until the moisture content of the krill falls to not more than 40%;

d) after treated in step c), the krill, whose moisture content has been not more than 40%, is treated with a shell crusher to separate shell from meat, and finally shelled krill is obtained;

e) impurities mixing in the shelled krill obtained in step d) are removed by vacuum to obtain shelled krill product.

10. The method according to claim 9, further comprising steps as follows:

f) the shelled krill obtained in step e) is screened according to the shape size.

g) the screened shelled krill is subjected to packaging according to its specifications and then to storage at room or cold temperature.

* * * * *